United States Patent [19]

Schorman

[11] Patent Number: 5,467,382
[45] Date of Patent: Nov. 14, 1995

[54] METHOD AND APPARATUS FOR CLONE DETECTION IN A COMMUNICATION SYSTEM

[75] Inventor: Eric R. Schorman, Bedford, Tex.

[73] Assignee: Motorola, Inc., Schaumburg, Ill.

[21] Appl. No.: 250,978

[22] Filed: May 31, 1994

[51] Int. Cl.⁶ .............................. H04Q 7/20; H04K 1/00; G07D 7/00
[52] U.S. Cl. .................... 379/58; 380/23; 340/825.34
[58] Field of Search .................... 379/58, 59, 60, 379/63, 57; 455/33.1, 33.2, 54.1, 53.1, 56.1; 340/825.3, 825.31, 825.32, 825.34, 825.5; 380/23

[56] References Cited

U.S. PATENT DOCUMENTS

| | | | |
|---|---|---|---|
| 5,335,265 | 8/1994 | Cooper et al. | 379/59 |
| 5,335,278 | 8/1994 | Matchett et al. | 455/33.1 |
| 5,345,595 | 9/1994 | Johnson et al. | 455/33.1 |

OTHER PUBLICATIONS

"Roamer Fraud Prevention", Kevin M. Thigpen, *Cellular Business*, Apr. 1990, pp. 28–34.
CSC Intelicom Advertisement, *Cellular Business*, Apr. 1993.

*Primary Examiner*—Curtis Kuntz
*Assistant Examiner*—Michael B. Chernoff
*Attorney, Agent, or Firm*—Kevin A. Buford

[57] ABSTRACT

A system for clone detection within a communication system includes a message generator for generating a message to a subscriber having a first identifier and forwarding the message for transmission over plural communications channels, a memory for receiving and storing a response to the message from each subscriber using the first identifier, and a processor for determining if an unauthorized subscriber is using the first identifier from the stored responses to the message.

13 Claims, 2 Drawing Sheets

5,467,382

METHOD AND APPARATUS FOR CLONE DETECTION IN A COMMUNICATION SYSTEM

TECHNICAL FIELD

This invention relates generally to communication systems and more particularly to wireless communication systems.

BACKGROUND Of THE INVENTION

Wireless communication systems, such as the cellular radio telephone systems, typically include subscriber units (such as mobile or portable units) which communicate with a fixed network communication unit via radio frequency (rf) transmissions. A typical fixed communication network includes at least a base station and a switching center. The switching center a subscriber unit accesses may not be its "home" switching center. In this case, the subscriber unit is termed a roamer. The switching center it accesses (termed the "visited" switching center) will communicate with the subscriber unit's "home" switching center via the public switched telephone network (PSTN). One responsibility of the fixed network communication unit is to grant use of the communication system to the subscriber unit after the requesting subscriber unit meets the authentication requirements of the system. In a typical cellular telephone communication system, each subscriber unit is assigned a telephone number (mobile identification number) (MIN) and a unit identification number (or electronic serial number) (ESN) which together serve as a unique identifier for the subscriber to any fixed network communication unit. The fixed network communication unit has access to these identification numbers through a database. Often these numbers are used by the fixed network communication units to bill subscribers for the time the subscriber uses the system. In the case of a roaming subscriber unit, the "visited" switching center must communicate with the subscriber's "home" system database to authenticate and bill the subscriber unit.

Detection of a legitimate subscriber's identification number may be accomplished by rf eavesdropping or by purposeful or inadvertent divulgence of the MIN/ESN combination by the radio telephone installer. Once the subscriber's telephone number and identification number is known (stolen), a thief may reprogram another subscriber unit with the stolen identification number causing two or more subscriber units to have the same MIN/ESN combination. These unauthorized, reprogrammed subscriber units are referred to as "clones." These clones may cause a number of problems for both the system operator and legitimate subscriber unit. A lot of air time, including long distance calls, could be charged against the legitimate subscriber; if undetected the legitimate subscriber will pay for these calls, and if detected (typically) the operator absorbs the costs. Additionally, it is possible that the clone's registrations could disrupt normal call delivery to the legitimate subscriber, and heavy usage could block calls by the legitimate subscriber.

In response to the problem of cloning several authentication schemes have been proposed. However, all of these schemes require additional programming or equipment and cannot be readily implemented with the millions of existing analog subscribers whose only means of authentication is the MIN/ESN. Another solution has been to maintain a database on subscribers with their usage patterns and analyze new calls against the stored pattern for possible fraud. However, this approach is passive only, waiting until a call is initiated, and is limited by the established pattern. The broader the pattern established by the legitimate subscriber, the easier it is for a clone to go undetected; the narrower the pattern, the more likely the legitimate subscriber will be inconvenienced by his own use outside the pattern. So, while effective anti-cloning schemes are being implemented for newer subscriber units, there remains a need for an active anti-cloning system that can be readily implemented with all subscriber units.

DESCRIPTION OF A PREFERRED EMBODIMENT

Figure 1:
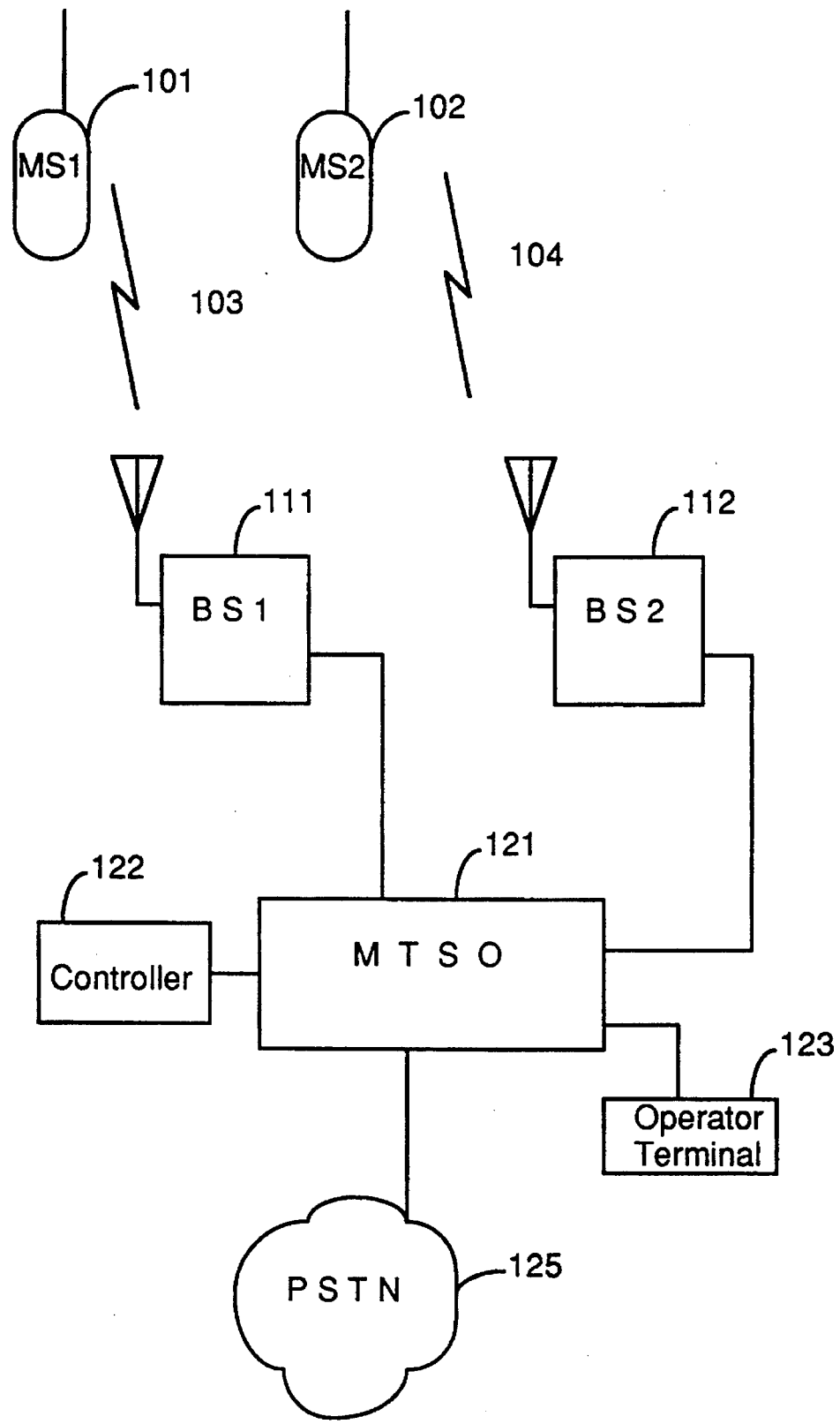
FIG. 1 is a layout diagram of one embodiment of a communication system within which the present invention may be practiced.

The foregoing problems and others are substantially met by the clone detection system of the present invention. In order to facilitate an understanding of the invention, its implementation in a specific type of communication system, a cellular radiotelephone system, is described below and in the drawings. Those skilled in the art will understand that the invention may be applied to other communication systems. However, as will be appreciated by the foregoing background and the following discussion the invention provides particularly advantageous results in existing cellular systems such as the analog AMPS (Advanced Mobile Phone Service) cellular service in the U.S.

One such cellular system is illustrated in FIG. 1. In this case several mobile subscriber units 101 and 102, or subscribers for short, are operating in a service area controlled by a mobile telephone switching office, MTSO 121. Each subscriber 101, 102 communicates with an assigned base station 111 and 112, respectively, via rf channels 103 and 104, respectively. These communications include both traffic and control communications. Traffic communications, such as voice conversations with telephone subscribers, are routed between the base station 111, 112 and telephone subscriber via MTSO 121 and public switched telephone network (PSTN) 125. Control communications, such as registration and paging commands, go between the subscriber 101 and relevant infrastructure entity, such as MTSO 121, via the assigned base station 111.

In legitimate operations each subscriber 101, 102 will have its own unique identifiers, i.e. a unique MIN and ESN. However, if one of the subscribers 102 is a clone, this subscriber unit 102 will have copied the MIN and ESN of another subscriber 101, so that any calls made by the clone 102 will be billed to subscriber 101. Even if a passive detection system is employed, when the clone 102 uses the MIN/ESN of subscriber 101 within the usage pattern of subscriber 101 there is no way to detect that a clone is using the same MIN/ESN.

Figure 2:
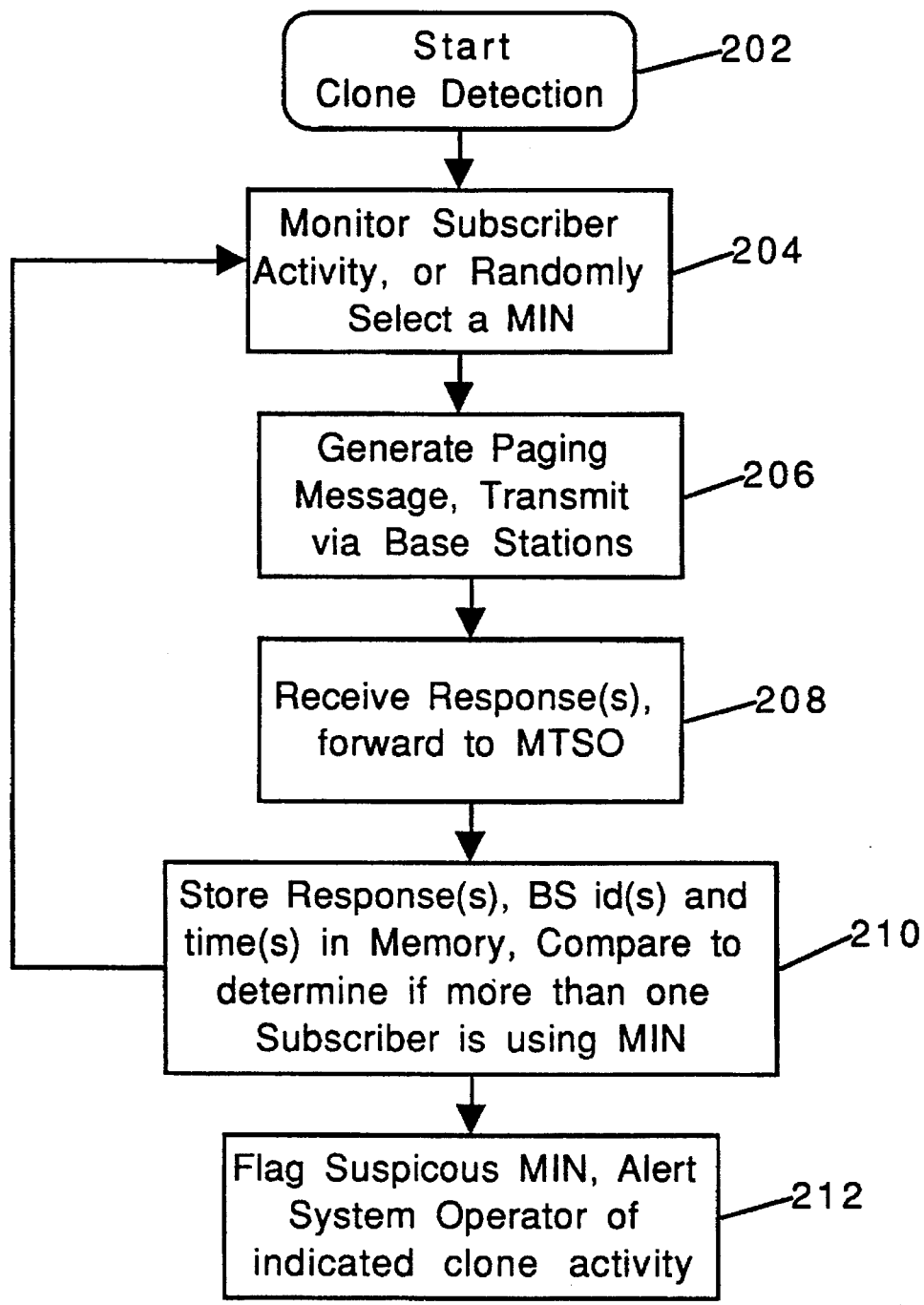
FIG. 2 is a flow chart of a clone detection procedure performed by the communication system of FIG. 1.

However, by using the present invention, an embodiment of which is illustrated in steps 202–212 of FIG. 2, early detection of such clones is now possible. This method is particularly advantageous because it only requires a minor modification to existing cellular infrastructure, and no modification to the millions of existing subscriber units.

The clone detection process of FIG. 2 begins with a random selection of a known subscriber MIN. Alternatively, the system operator could be using some predetermined criteria for monitoring subscriber activity, such as the known software for analyzing subscriber activity patterns, or software for detecting simultaneous use of a MIN/ESN by two subscribers. Examples of the predetermined activities that could be used include crossing-thresholds of air-time, number of call originations, originations versus terminations, third-party calls, long distance calls, and the like. In either event, once a MIN is identified a paging message is generated by the MTSO 121. This paging message is broadcast using standard cellular paging techniques, which typically involves a control message from the MTSO 121 to all base stations 111, 112 in its service area to transmit the paging message. Those subscriber(s) using the MIN in the paging message then send a response indicating that they are active. In the situation illustrated by FIG. 2, since both subscriber 101 and clone 102 are using the same MIN, both units 101, 102 send a response 103, 104, which responses are received by the base station 111, 112 respectively serving the separate cells in which the units 101, 102 are operating.

Each response is forwarded to a controller 122 of MTSO 121, which may be one of the processors typically found in an MTSO along with an associated memory device and message signal generator. Along with each response an identifier, indicating which base station 111, 112 received the respective responses 103, 104, is also forwarded to the controller 122. These responses and associated base station identifiers are stored in the controller's memory along with an indication of the time received. The controller in turn compares the responses to determine whether there is an indication of clone activity. This comparison process would preferably include a routine for checking to see whether multiple responses are received within a relatively short predetermined period of time. If these responses were received from adjacent base stations, in order to rule out the possibility that the same subscriber 101 answered pages from both base stations the controller could be set up to generate a second paging message after a predetermined period of time before flagging the MIN as possibly being cloned. Alternatively, the responses could be collected for a much longer period of time and compared, for example to determine the probability of MIN usage in geographically separated cell sites as an indication that more than one subscriber is using the MIN. A record could also be kept of inquiries from "visited" systems to the "home" system database, so that a determination could be made whether a MIN is being used in multiple operator systems. If appropriately networked, when a MIN is selected that is being used by a roamer, a paging message could be broadcast in both the "home" and the "visited" service areas. One skilled in the art will appreciate that many other criteria and protocols may be employed for determining the probability that a clone 102 is operating using another subscriber's 101 MIN.

Once it is determined that a clone has been detected, the controller 122 would alert the system operator(s). An operator would be alerted, for example by having a message forwarded to an operator terminal or other notifier device for further action. Additionally, if there was a strong probability of detection, the controller could automatically direct the MTSO to divert calls using the compromised MIN to a system operator for further authentication, such as a special PIN. The system operator would also want to notify the legitimate subscriber that its MIN/ESN has been stolen and request that the subscriber unit be brought in for replacement of the MIN/ESN.

While the invention has been described in connection with a presently preferred embodiment of a cellular radio-telephone system, it should be understood that the above discussion is not a limitation on the scope of the invention. As those skilled in the art will appreciate, numerous alternative embodiments exist or may be devised that will be within the spirit and scope of the invention as claimed below.

I claim:

1. A method of detecting unauthorized subscribers in a communication system having plural subscribers each having an identifier and at least one base station, comprising the steps of:

transmitting a message including a first identifier of an authorized subscriber from the base station;

receiving a response to the message from each subscriber using the first identifier; and storing each response and determining if an unauthorized subscriber is using the first identifier based on the number of stored responses to the message from different subscribers all using the first identifier.

2. The method of claim 1 further comprising the step of:

monitoring subscriber activity for predetermined activity indicative of an unauthorized subscriber; and generating the message in response to an occurrence of the predetermined activity.

3. The method of claim 1 wherein the identifier of each subscriber is a mobile identification number (MIN), and the step of transmitting a message further comprises transmitting a paging command including a first MIN.

4. The method of claim 1 wherein the at least one base station comprises plural base stations, the communication system includes a processor coupled to the base stations, the step of transmitting further comprises transmitting the message from each of the base stations, each response is received by a receiving base station of the plural base stations, and the step of storing and determining further comprises forwarding each response from the receiving base station to the processor along with a receiving base station identifier, storing each response and receiving base station identifier for a predetermined period in the processor, and comparing the receiving base station identifiers to determine whether an unauthorized subscriber is using the first identifier.

5. The method of claim 4 wherein the step of storing and determining further comprises storing an associated time at which each response and associated receiving base station identifier is received and comparing all the stored times and associated receiving base station identifiers to determine whether more than one subscriber is using the first identifier.

6. The method of claim 1 further comprising the step of generating the message on a random basis from a subscriber list.

7. The method of claim 1 wherein plural messages are transmitted, and the step of storing and determining includes storing each response to the plural messages and determining if an unauthorized subscriber is using the first identifier from the stored responses to the plural messages.

8. A controller for use in a communication system having plural base stations coupled to the controller for communication with plural subscribers each having an identifier, comprising:

means for generating a message including a first identifier of an authorized subscriber for for transmission by the plural base stations;

means for receiving and storing a response to the message from each subscriber using the first identifier; and means, coupled to the means for receiving and storing, for determining if an unauthorized subscriber is using the first identifier based on the number of stored responses to the message from different subscribers all using the first identifier.

9. The controller of claim 8 further comprising:

means, coupled to the means for generating, for monitoring subscriber activity for predetermined activity indicative of an unauthorized subscriber using the first identifier and, in response to an occurrence of the predetermined activity, controlling the means for generating to generate the message.

10. The controller of claim 8 wherein the identifier of each subscriber is a mobile identification number (MIN), and the means for generating a message is further adapted for generating a paging command including a first MIN.

11. The controller of claim 8 wherein the means for receiving is further adapted for receiving each response along with an associated receiving base station identifier, which identifies a base station receiving the response from a subscriber, and storing each response and receiving base station identifier for a predetermined period, and the means for determining is further adapted for comparing the stored responses and receiving base station identifiers to determine whether an unauthorized subscriber is using the first identifier.

12. A communication system having plural base stations for communication with plural subscribers each having an identifier, comprising:

a message generator operable for generating a message including a first identifier of an authorized subscriber and forwarding the message to the plural base stations for transmission over a paging channel;

a memory, coupled to the plural base stations, operable for receiving and storing a response to the message from each subscriber using the first identifier; and a processor, coupled to the memory, operable for determining if an unauthorized subscriber is using the first identifier from the number of stored responses to the message from different subscribers all using the first identifier.

13. The communication system of claim 12 further comprising an operator notifier device coupled to the processor and operable for alerting a system operator when the processor determines that an unauthorized subscriber is using the first identifier.

* * * * *